United States Patent
Angwin et al.

(10) Patent No.: US 8,160,566 B2
(45) Date of Patent: Apr. 17, 2012

(54) MESSAGE SENDER CONTROLLABLE MESSAGING SYSTEM

(75) Inventors: Alastair John Angwin, Eastleigh (GB); Chang Jie Guo, Beijing (CN); Jun Shen, Beijing (CN); Song Song, Beijing (CN); Pei Sun, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/664,078

(22) PCT Filed: Sep. 9, 2005

(86) PCT No.: PCT/EP2005/054478
§ 371 (c)(1),
(2), (4) Date: Aug. 14, 2007

(87) PCT Pub. No.: WO2006/034952
PCT Pub. Date: Jun. 4, 2006

(65) Prior Publication Data
US 2007/0293195 A1    Dec. 20, 2007

(30) Foreign Application Priority Data

Sep. 28, 2004    (CN) .......................... 2004 1 0012092

(51) Int. Cl.
*H04M 3/00*    (2006.01)
(52) U.S. Cl. .......... 455/420; 455/419; 455/42; 455/410; 455/411; 455/412.2; 455/3.03; 455/412.1; 455/466; 455/414.1; 713/165; 713/166; 709/206; 709/207

(58) Field of Classification Search .................. 455/419, 455/420, 410, 411, 3.03, 412.2, 412.1, 466, 455/414.1; 713/165, 166; 709/206, 207
See application file for complete search history.

(56) References Cited

U.S. PATENT DOCUMENTS

| | | |
|---|---|---|
| 5,958,005 A * | 9/1999 | Thorne et al. ................. 709/202 |
| 6,769,067 B1 * | 7/2004 | Soong ............................... 726/2 |
| 7,356,564 B2 * | 4/2008 | Hartselle et al. ............. 709/206 |
| 2004/0171376 A1 * | 9/2004 | Engstrom et al. ............. 455/419 |
| 2004/0243941 A1 * | 12/2004 | Fish ............................. 715/752 |

* cited by examiner

*Primary Examiner* — Kwasi Karikari
(74) *Attorney, Agent, or Firm* — William Stock; Anne Vachon Dougherty (57) ABSTRACT

The present invention relates to a mobile phone and a method for its operation and control. The mobile phone is capable of receiving the message sent by other mobile phones through a message transmission system. The method comprises: receiving the message from another mobile phone, wherein the received message comprises a presentation part and an associated control part, the control part being used for the control and management of the processing of the received message; extracting the control part from the received message; and executing the operation related to the message based on the extracted control part. According to an embodiment, if the control part received by the mobile phone comprises the notification mode control command, the mobile phone issues a message notification according to the notification mode control command, disregarding the message notification mode pre-configured on the mobile phone. Thus the requirement of the sender personalized message service can be satisfied.

14 Claims, 4 Drawing Sheets

MESSAGE SENDER CONTROLLABLE MESSAGING SYSTEM

FIELD OF INVENTION

The present invention relates to telecom messaging services, particularly to mobile phones in messaging service systems. More specifically, the present invention relates to the control of sending and receiving messages with mobile phones.

BACKGROUND OF INVENTION

Messaging Services like Short Message Service (SMS), Multimedia Message Service (MMS) have been widely deployed today. MMS is a value-adding function service for mobile phones. Compared to SMS, it makes the message transmitted between mobile phones no longer to be merely simple and short text. Rather, the message may incorporate rich multimedia information like text, picture, audio-visual, and voice. The wide application of MMS increasingly demands the provision of personalized and flexible messaging services. The needs for personalization and flexibility are not only required on the recipient side of message, but also gradually required on the sender side. The sender's involvement in the control and manipulation of the sent message on the recipient side is an embodiment of such a personalization. However, the personalization is far from being satisfying in prior art messaging services.

For example, currently the message notification mode is pre-configured at the receiver side. There are some kinds of messaging software (messaging agent) which even allow for pre-configuration of the message notification mode, e.g., special ring tone or volume, corresponding to a particular sender. However, those solutions are static or unchangeable to the sender, and thus not flexible to meet the sender's requirements. For example, suppose a sender wants to send an urgent message to a target mobile phone. At that time, the notification mode of the target mobile phone may have been pre-configured as "silent" by the messaging receiver. In order to notify the receiver with the good effect, the sender wants to override whatever original notification mode on the mobile phone with a loud ring tone mode. But current mechanisms do not support this function.

The static nature and inflexibility of the current way of configuring the message notification mode for mobile phones is also reflected in that the receiver can only select a notification mode from the notification modes existing in his/her mobile phone. The receiver can at most expand the existent notification modes by downloading ring tones. However, the receiver's mobile phone allows for neither sender designated ring tones, nor sending particular ring tones to the receiver's mobile phone. For the message sender, there is a lack of the option for sending messages to the targeted receiver in a personalized way.

Therefore, there exists such a need that the message sender can instantly change, in an end-to end way, the notification mode in which a target mobile phone receives his/her messages.

In the aspect of managing messages by the receiver, the existing messaging services does not provide personalized service flexible enough so that managing received message on the receiver side involves the senders. For example, currently, messages received on the mobile phone are saved in the message inbox. There is not a mechanism for the receiver mobile phone to automatically delete some of the messages from the inbox, which is sometimes undesirable for the sender. For example, the sender may want to limit the time duration a sent message will be saved in the inbox. The sender may want to restrict the number of times a sent message shall be read by deleting the message once the number is reached. Therefore, there exists a need for sender-controllable archiving of messages.

Moreover, the receiver of a message in reply to an original message is usually assumed to be the sender of the original message. In some cases, the sender of the original message may desire that a third party is the receiver of the message in reply to the original message. For example, One sending a message on behalf of another person may desire that replies to the message will be directly sent to the another person. Moreover, the receiver may forward a message after receiving it. Sometimes, a sender perhaps may expect the receiver to forward the received message only to a particular group of people. However, the existing messaging services does not provide the functions of selectively restricting, by the sender of a message, the target to which the message may be forwarded or the expected receiver of the reply to the message.

DISCLOSURE OF THE INVENTION

Advantageously, a message sender of the mobile phone may participate in the control of the message behaviors on the recipient mobile phone in an end-to-end way.

According to a first aspect, the present invention provides a method for controlling a mobile phone, wherein the mobile phone is capable of receiving a message sent by another mobile phone through a message transmission system, the method comprising the steps of: receiving the message from another mobile phone, wherein the received message comprises a presentation part and an associated control part, the control part associated with control of processing of the received message; extracting the control part from the received message; and executing an operation associated with the message based on the extracted control part.

According to an embodiment of the present invention, the control part may comprise one or more of the following: a notification mode control command, a forwarding control command, an archiving control command, a reply-to recipient control command, wherein each command may have associated control parameters.

According to an embodiment of the present invention, the message may take the format of MIME, wherein the one or more control commands are included in the MIME header, and the control parameters are included in the MIME body. In addition, the presentation part of the message comprises message layout and message data, the message layout being included in the MIME header, and the message data being included in the MIME body.

According to an embodiment of the present invention, the control command is based on the XML language.

According to a second aspect, the present invention provides a mobile phone having a receiving device for receiving a message sent by another mobile phone through a message transmission system, comprising: a message decomposition unit for decomposing the received message into a presentation part and an associated control part, the control part associated with control of processing of the received message; and an execution device for executing an operation associated with the message based on the control part.

Preferably, the mobile phone comprises a receiving device for receiving the message sent by other mobile phones through a message transmission system, and an execution device for executing the control and management related to the received message. Besides, the mobile phone may also comprise a message decomposition unit for decompose the received message into a presentation part and a control part, wherein the control part describes how the received message is controlled and managed on the mobile phone; and the execution device performs the appropriate operations according to the control part.

According to an embodiment of the present invention, if the control part comprises a notification mode control command, the message notification device will issue a message notification according to the notification mode control command, overriding the message notification mode pre-configured on the mobile phone.

According to a third aspect, the present invention provides a method for controlling a mobile phone, wherein the mobile phone has a user interface generator for generating a user interface for the user of the mobile phone to enter a message and a sending device for sending the message to another mobile phone through a message transmission system, the method comprising the steps of: generating a user interface for entry of a presentation part and a control part; formatting the presentation part into a form identified to be displayed to the recipient; formatting the control part into a form identified to be control data; and packaging the formatted presentation part and control part into a complete message for sending by the sending device.

According to a fourth aspect, the present invention provides a mobile phone having a sending device for sending a message to another mobile phone through a message transmission system, comprising: a user interface generator for generating a user interface for entry of a presentation part and a control part; a message presentation generator for formatting the presentation part into a form identified to be displayed to the recipient; a control command generator for formatting the control part into a form identified to be control data; and a packaging module for packaging the formatted presentation part and control part into a complete message for sending by the sending device.

According to a fifth aspect, the present invention provides a computer program comprising program code means adapted to perform all the steps of the methods described above when said program is run on a computer.

The present invention, by specifying the control command in sending message and executing the control command on the recipient side, can satisfy the requirement for sender personalized message service, for example the requirement for personalized message notification mode.

The above and other features of the present invention will become clearer upon reading the following detail description of embodiments with reference to accompanied drawings.

BRIEF DESCRIPTION OF THE DRAWINGS

The accompanying drawings are part of the description and useful for illustrating embodiments of the present invention and for explaining the principle of the present invention together with the description, wherein like reference signs represent the same or similar elements.

DETAILED DESCRIPTION OF PREFERRED EMBODIMENTS

Figure 1:
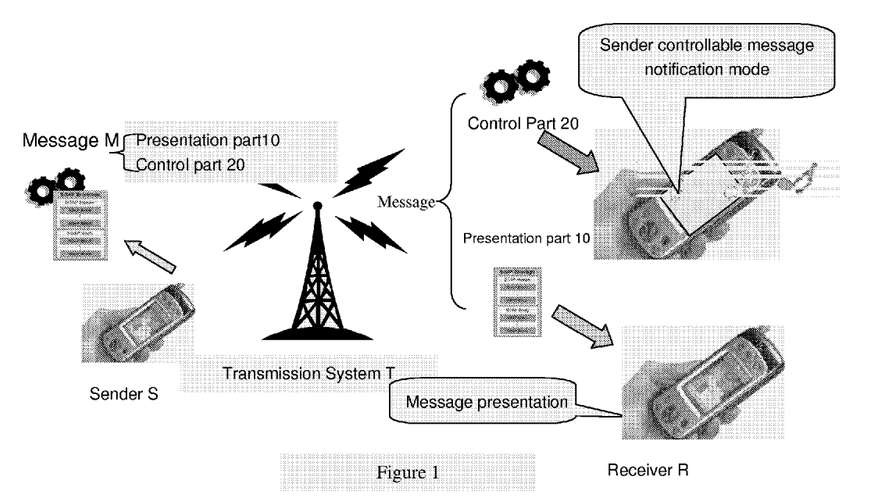
FIG. 1 shows a schematic view of a general process of sending and receiving messages by mobile phones according to the present invention.

FIG. 1 is a schematic view of a general process of sending and receiving messages by mobile phones according to the present invention. As shown in FIG. 1, the sender first operates a mobile phone S, enters message M, and then send it to a target mobile phone R over a transmission system T. The recipient user, after receiving the notification, may display the presentation part 10 on the screen of the mobile phone M in a conventional way. In contrast with prior art technologies, the mobile phone S of the present invention additionally allows the sender to include control data in the message M. In other words, the message received by the recipient mobile phone comprises the conventional presentation part 10, but also a control part 20. The control part 20 is used to specify, upon the arrival of the message in the recipient mobile phone R, how the mobile phone R will act and how the received presentation part 10 will be manipulated. The recipient mobile phone R will operate according to the specification of the control part 20. For example, if the control part 20 comprises a control command 201 which requires to notify the receiver of the arrival of the message in a specific way, the recipient mobile phone, after receiving the message, will issue notification in the manner as specified by the control command 201. After the presentation of the presentation part 10 on the screen of the mobile phone, subsequent operations may also be controlled by other types of control command 201.

Figure 2:
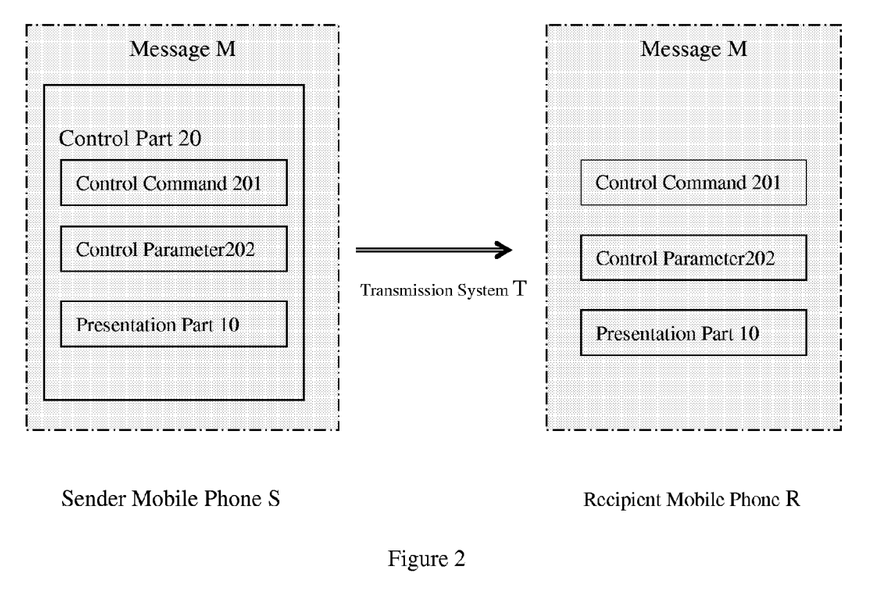
FIG. 2 shows a schematic view of the structure of the message sent and received according to the present invention.

FIG. 2 shows a schematic view of the structure of the message sent and received according to the present invention. According to this present invention, the message M to be transmitted from the sender mobile phone comprises two parts: a presentation part 10 and a control part 20. The presentation part 10 actually denotes the so-called message in the prior art technology, i.e., the message the sender wants to eventually display on the recipient mobile phone R, including text, picture, video image, sound, etc., as is well known in the prior art technology.

According to the present invention, the control part 20 is the specification made by the sender for the control of the recipient mobile phone R. This kind of specification may comprise instructing how the recipient mobile phone R will notify the receiver of the arrival of the message M, and/or instructing how the presentation part 10 will be manipulated, for example, how the presentation part 10 will be forwarded, archived or replied. The control part 20 comprises one or more control commands 201, and control parameter(s) in association with individual control command(s). The control part 20 may be specified on the mobile phone R by the sender in a variety of ways.

Once the user has completed the entry and issued the send command, the control part 20 and the presentation part 10 will be packaged into a message M, which is sent to the target recipient mobile phone R via the transmission system T.

When the message M is transmitted to the recipient mobile phone R, it will be separated into two parts: the presentation part 10 and the control part 20. As described previously, the presentation part 10 can be displayed on the screen by the mobile phone R in a conventional manner.

As described previously, the control part 20 comprises control command(s) 201 and optional control parameter(s) 202 which are used by the recipient mobile phone R to perform corresponding operations so as to realize the sender expected control of the mobile phone R and/or subsequent control of the manipulation of the presentation part 10. For operations on the recipient mobile phone R, further description will be given below with reference to FIG. 4.

Figure 3:
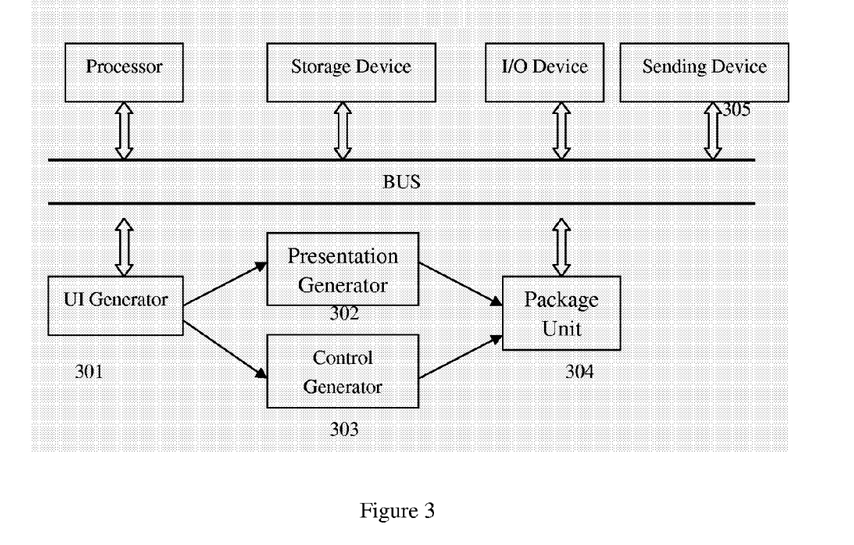
FIG. 3 shows a block diagram of an embodiment of a mobile phone according to the present invention.

Turn now to FIG. 3, which shows a structural block diagram of a preferred embodiment of a mobile phone S according to the present invention. A conventional mobile phone includes processor P, storage means S, I/O devices such as display and keyboard, sending device used for the communication with outside networks. The above structural components and their functions are well known in the prior art technology and thus no further description will be given here with respect to their details.

According to the present invention, the mobile phone S may optionally comprise a user interface (UI) generator 301. In addition, it may comprise a presentation generator 302, a control command generator 303 and a package unit 304.

The function of the user interface 301 is to render a user interface (UI) on the screen. One of the functions of the UI is to let the message sender specify the massage to be transmitted. Conventional mobile phones also provide similar UIs, for example, for the user to input and edit message. However, such a message is equivalent to the presentation part 10 in FIG. 10, which is only for browse and process by the recipient of the message but does not include any information which can control the process of the received message by the receiver.

The UI generator 301 according to the present invention may generate two kinds of UIs on the mobile phone S.

The first kind of UI, also referred to as the first sub-interface, is used for the user to input the presentation part 10. The format, content and operation procedure of it are substantially the same as the prior art technology and thus will not be described here.

The second kind of UI, also referred to as the second sub-interface, is used for the user to enter the control part 20 associated with the presentation part 10.

According to an embodiment, in the first kind of UI there may be provide an option for the user to select whether to "input control data" or not, for example a button displayed on the screen that represents the option "input control data". For example, upon completion of entering and editing the presentation part 10, if the user makes a selection by pressing the button "input control data", the UI generator will generate the second kind of UI. Then, the user may describe or input the control part 20, including control command(s) 201 and control parameter(s) 202 as necessary, associated with the presentation part with the second kind of UI. For example, a selection menu is displayed on the screen for the user to make selection from the control commands 201 listed on it. If a control command needs parameter(s) 202, a corresponding parameter menu may be additionally displayed for the user to select the parameter 202. A default value may be set for each parameter, or an input field may be provided for the user to enter other parameter values.

It would be obvious for one skillful in the art that the first sub-interface may consist of one screen, or of multiple consecutively displayed screens. Similarly, the second sub-interface may consist of one screen, or of multiple consecutively displayed screens. And the first and second sub-interface may be in one and the same screen or in different screens, depending on concrete situations. In addition, in practice, there in no need to limit the order in which the first sub-interface and the second sub-interface are to be presented.

The message presentation generator 302 receives from the UI the presentation part 10 entered by the user, and transforms it into a format. The format may manifest that that part is the message content to be eventually rendered to the receiver. What format is adopted may depend on practical implementations, for example, on the description language employed. In this regard, there are ready examples in the prior art technology, and thus no detailed description will be given here. In an embodiment of the present invention, the presentation part is transformed into MIME-formatted content.

The control command generator 303 receives from the UI the control part 20 entered by the user. As described above, the control part 20 is the specification made by the user for the control of the recipient mobile phone, which is used for instructing how the recipient mobile phone R will notify the receiver of the arrival of the transmitted message, or instructing how the presentation part 10 will be manipulated, for example, how the presentation part 10 will be forwarded, archived or replied. The control command generator 303 separates the control part 20 into control commands 201 and control parameters 202, and establishes the association of control commands 201 with respective control parameters 202. The control command generator 303 may also establish the association of control commands 201 with the presentation part. For example, each control command 201 and its associated control parameter may be attached a respective label and saved as a separate item in a document of control commands. According to an embodiment of the present invention employing the MIME format for the representing of the message, the file of control commands is a XML-based document segment. The embodiment will be explained below with reference to FIG. 5.

The package unit 304 receives the formatted presentation part 10 generated in the message presentation generator 302 and the formatted control part 10 generated in the control command generator 303, for example, the control command document, and then packages them into a complete message. Specifically, into a document in a format out of many possible formats, the presentation part 20 is inserted. The recognizable control part 20 may also be inserted, and the association of the presentation part 10 with the control part 20 is established. According to an embodiment of the present invention, the document consisting of such a complete message is in the form of a MIME document.

The packaged document will be sent by the sending device 305 to an external message transmission system T, which will in turn transmit it to the target mobile phone R. The transmission process may comply with, for example, the message transaction specifications.

Obviously, through above descriptions, one skillful in the art would appreciate that the user interface (UI) generator 301, presentation generator 302, control command generator 303 and package unit 304 of the mobile phone S according to the present invention may be implemented in the form of hardware or software, or a combination thereof. One implementation solution would be realized by improving the existing MMS user agent.

Figure 4:
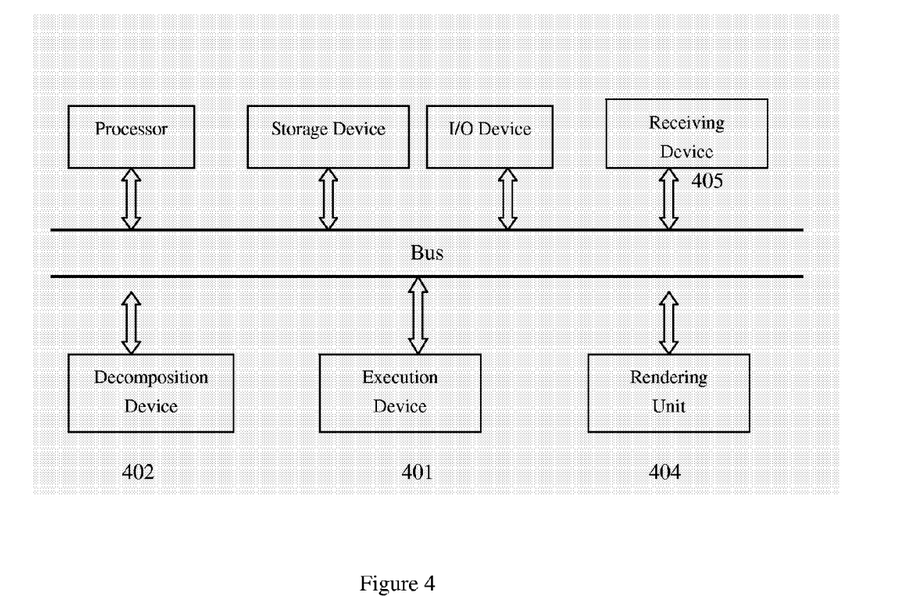
FIG. 4 shows a block diagram of another embodiment of a mobile phone according to the present invention.

Turn now to FIG. 4, which shows a block diagram of another embodiment of a mobile phone R according to the present invention. The mobile phone R may be used to receive the message according to the present invention. As shown in FIG. 4, the mobile phone R also comprises a conventional microprocessor, storage means, I/O devices such as display screen, keyboard and buzzer, a receiving device 405 for communicating with external networks, rendering unit 404 for rendering message to the user of the mobile phone.

Moreover, the mobile phone may optionally comprise an execution device 401 for performing the control and management related to the received message. Generally, the execution device 401, upon receipt of the message, will instruct the mobile phone R to issue a notification, e.g., vibration or ring tone, according to a pre-configured default configuration. The execution device may also interact with the user and perform such functions as storing, forwarding and replying to the message. In practical implementations, the execution device may be embodied as a hardware entity or a software entity.

The mobile phone R according to the present invention may additionally comprise a message decomposition device 402 for decomposing the received message into a presentation part 10 and a control part 20. The control part 20 describes how the received message will be controlled and managed on the mobile phone.

The mobile phone according to the present invention operates as follows. When the receiving device 405 receives a message from another mobile phone transmitted through the message transmission system, for example, according to the message transaction specifications, the message is delivered to the decomposition device 402. The decomposition device 402 distinguishes the control part 20 and the presentation part 10 in the input message and extracts them separately. As is known by those skilled in the art, the manner in which the control part 20 and the presentation part 10 are extracted depends on the definition of the format of the message. According to one embodiment, the extraction can be realized with operations performed in a way that is opposite to that of the operations by the generators 302 and 303. The principle of the extraction will be further described below with reference to a message format shown in FIG. 5.

The extracted presentation part 10 is either saved or directly passed to the message rendering unit 404, which will generate user readable information according to the data as described in the presentation part 10 for display on the display screen of the receive side. The rendering unit 404 may be implemented by any message rendering method of the prior art technology, and thus will not be described in detail here. According to one embodiment of the present invention, the presentation part 10 may comprise message layout description and relevant message data.

The extracted control part 20 is passed to the execution device 401, which may call or execute the following functions: message notification, message archives and user action.

As is well known, presently the message notification mode is preset by the mobile phone R. For example, the message notification mode may be ring tone or vibration. Some messaging software (e.g., messaging agent) may even allow the mobile phone R to pre-configure the message notification mode corresponding to a particular individual. For example, messages from different persons may have corresponding different ring tones. But those message notification modes are pre-configured. The sender of the message is not capable of controlling the configurations. For example, if the message notification mode of a recipient mobile phone is pre-configured as silence, the mode will keep unchanged unless it is changed.

According to the present invention, the message sender may specify an overriding notification mode with the control part 20 of the message. By "overriding notification mode" it means that the recipient is notified at the mobile phone R in the way specified by the message sender, no matter what the originally pre-configured message notification mode is.

The control part 20 using MIME format according to an embodiment of the present invention may comprise the following as the notification request description:

```
<Message Notification>
    <Vibration Mode status="on" />
    <Ringtone Mode volume="maximum">
        <Ringtone Data>
            1388@217403RingtoneData
        </Ringtone Data>
    </Ringtone Mode>
</Message Notification>
```

The above notification request description shows that the sender requires that the receiver be notified in a overriding notification mode; specifically, by vibration in addition to ringtone with maximal volume. The content of the ring tone is identified by "1388@217403RingtoneData". The execution device 401 of the mobile phone R performs operations according to the control part 20 incorporating the above notification request description decomposed by the decomposition device 402, causing the mobile phone R to vibrate and sound, in maximal volume, the ring tone which content is specified by "1388@217403RingtoneData". At this point, the execution device 401 disregards the pre-configured message notification mode, e.g., "silence", of the mobile phone.

Message archiving is a feature that can be implemented by the execution device 401. Execution devices 401 of the prior art technology will save the message received at the mobile phone R in the message inbox, but will not selectively and automatically delete any message. According to the present invention, if the sender, when sending his message, specifies an "automatic deletion" command 201 in the control part 20 and also sets its associated parameter 202 to be "3 days", then the execution device 401 may automatically delete the presentation part 10 from the inbox upon the expiration of the 3 days since the receipt of the message by checking the timestamp of the presentation part 10. Moreover, the sender may want to restrict the number of times a sent message shall be read; in other words, the message will be deleted once the number is reached. The sender may specify the appropriate command and parameter in the control part. The execution device 401 may set a counter for the associated presentation part 10 according to the command. The counter will increase one each time the presentation part 10 is read. Once the number of times specified by the parameter is reached, the execution device 401 will automatically delete the associated message. In this way, the sender-controllable message archiving may be realized.

The user actions denote the user's subsequent operation initiated at the mobile phone R after the presentation part 10 is displayed. Typically, after the presentation part 10 is displayed, the prior art execution device 401 will prompt or allow the user to perform further operations, such as save, delete, reply and forward, on the displayed message. According to the present invention, the sender may require the performance of the user action to follow the sender-prescribed rules. For example, sometimes, the sender of the original message may desire that a third party will be the receiver of the message in reply to the original message. Particularly, when sending an original message on behalf of another person, the sender may desire that the receiver will send any reply to the message directly to the another person. To this end, the sender may specify an address (i.e., phone number) to which the reply is to be sent in the control part of the message. If a "reply" operation is initiated by the receiver at the mobile phone R after the message is received, the execution device 401 executing the operation will check if an address for reply is specified in the set of control commands of the message. If so, the execution device 401 will set the specified address as the address for the current reply operation. Similarly, the sender may also specify a series of addresses (phone numbers) to which the message may be forwarded. If a "forward" operation is initiated by the receiver, the execution device 401 will automatically set the series of addresses as the destination addresses of the current forward operation.

The execution device 401 may be a message control command container providing a runtime environment for the execution of message control commands. The container is the intermediate layer connecting the abstract message control command and the underlying device API functions. In one embodiment, It ensures the secure message control command execution by verifying if there is any malicious control action to be performed. After the security checking, the legal control commands are categorized for use at different stages of the message control. According to one embodiment, the mobile phone R may comprise other separate message control function modules for realization of the functions of controlling message notification, message archiving and user actions, etc. In that case, the message control command container will also be responsible for scheduling the execution of such message control function modules during message processing.

Those skilled in the art would obviously appreciate that the receiving device 405, the execution device 401 and the rendering unit 405 according to the present invention may be implemented in the form of hardware or software, or a combination thereof. For example, they can be implemented by a MMS user agent.

Figure 5:
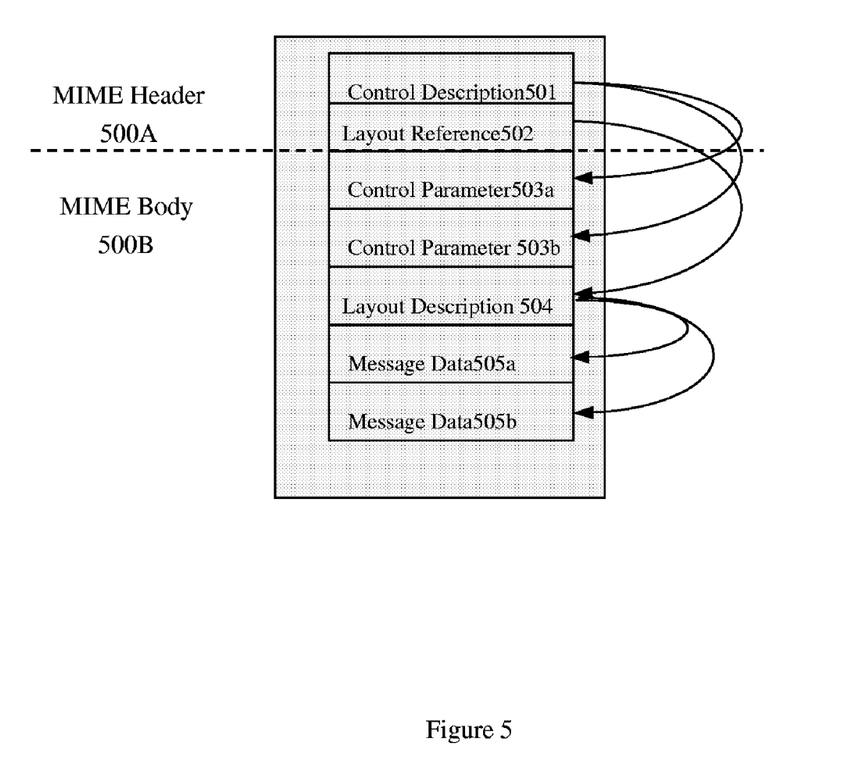
FIG. 5 is a schematic view of the MIME format employed in an embodiment according to the present invention.

FIG. 5 is an example of a message 30 according to an embodiment according to the present invention. To illustrate how the present invention works, MIME (Multimedia Internet Mail Extensions) is selected as the message format. It is well known that MIME allows for definition of different sub-categories, enabling multimedia message to include data like text, picture, image and sound. XML (Extension Markup Language) is selected as the control command description language. XML is a cross-platform, software and hardware independent tool for transmitting information and is useful to structure, store and send information.

As shown in FIG. 5, the multimedia message M sent by the sender may be represented by a MIME document which consist of two parts, MIME header 500A and MIME body 500B.

The MIME header 500A further comprises the message sender control description 501 and the message layout reference 502. The message control description 501 is XML based, which describes the consequent message management and control the sender expects on the receiver side. The message layout reference 502 points to the message layout description 504 that is located in the MIME body. The message layout description is the instruction on how the message rendering result should be, and is associated with one or more message data units 505. The message layout reference 502, message layout description 504, and message data unit 505 correspond to the presentation part 10 in FIG. 2. Their implementation in the MIME document is well known in prior art technology and thus is not described in detail here.

In the MIME document, the control parameters 503 (503a, 503b . . . ) associated with the control description 501 are located in the MIME body. According to one embodiment of the present invention, the control part 20 (FIG. 2) may have control description 501 and control parameter 503, wherein the control description may represent one or more control command 201 and the control parameter 503 may represent one or more control parameters 202. According to one embodiment of the present invention where the sender requires personalized message notification, after the message including a control part 20 and a presentation part 10 is input into the mobile phone S, the control command generator 303 will transform the control command 201 within the control part 20 into a part of the control description 501 in the MIME format and then insert it into the MIME header 500A, for example:

```
<Message Notification>
    <Ringtone Mode volume="maximum">
        <Ringtone Data>
            1388@21753RingtoneData
        </Ringtone Data>
    </Ringtone Mode>
</Message Notification>
```

At the same time, the control command generator 303 will insert for example the following segment as the control parameter 503 into the MIME body, based on the sender-entered control part 20:

```
--NextPart__000__0028__01C19839.84698430
Content-Type:Audio/MIDI
Content-ID: 1388@21753RingtoneData
Content-Transfer-Encoding: base64
R0lGODdhZAAwAOMAAAAAAIGJjGltcDE0OOfWo6Ochbi1n1pmcbGojpKbnP/lpW54fBMTE1RYXE
FO
...
``` wherein "Content-ID: 1388@21753RingtoneData" is the content identifier of the actual data of the control parameter. The control command 201 keeps the reference to the segment by the same content identifier 1388@21753RingtoneData.

Accordingly, after the message including the above content in the form of a MIME document is received by the mobile phone R, the decomposition device 402 of the mobile phone R will analyze the document and decompose it into control command 201 and control parameter 202. Then, the execution device 401 may execute the sender-specified personalized notification based on the control command 201 and control parameter 202. Besides the above examples, additional control commands 201 may be included in the MIME header, for example:

```
<Message Control Command>
    <Message Notification>
        <Vibration Mode status="on" />
        ......
    </Message Notification>
    <Message Forward rules="group restricted">
        <Permitted Forward Group>
            2423@453256FwdGroup
        </Permitted Forward Group>
    </Message Forward>
    <Message Reply address = "+8613901234432"
    </Message Reply>
</Message Control Command>
```

In addition to the notification mode command, the control description shown above also includes the control commands for Forward and Reply. In the control description for Forward, "2423@453256FwdGroup", which designates the targets to which the corresponding message is to be forwarded, points to the control parameter(s) containing specific phone number(s). Of course, other commands such as archiving and saving may also be included in the control description in a similar way.

The present invention has been described, by way of examples, with reference to its preferred embodiments. However, it is not intended that the above description and the details of the embodiments may be construed as any limitation to the protection scope of the present invention. For example, the functional components of the mobile phone S and the functional components of the mobile phone R described above may be implemented in one and same mobile phone. As another example, the functional features and steps described in the embodiments may be implemented in the form of hardware, software or a combination thereof. Also, the data in the embodiments are not necessarily restricted by any one format, as long as the format is capable of implementing the function of the present invention. Therefore, those skillful in the art would appreciate that, with the teachings of this specification, various modifications can be made to the embodiments of the present invention without departing the scope of the present invention.

The invention claimed is:

1. A method for controlling a mobile phone, wherein the mobile phone is capable of receiving a message sent by another mobile phone through a message transmission system, the method comprising the steps of:
   receiving the message from another mobile phone, wherein the received message comprises a presentation part and an associated control part, the control part associated with control of processing of the received message;
   extracting the control part comprising at least one command from the received message; and
   automatically executing an operation associated with the message whereby settings for the receiving mobile phone are overridden based on the extracted control part.

2. The method as claimed in claim 1, wherein the extracted control part comprises one or more of the following:
   a notification mode control command, a forwarding control command, an archiving control command, a reply-to recipient control command.

3. The method as claimed in claim 2, wherein each command has at least one associated control parameter.

4. The method as claimed in claim 2, wherein the extracted control part comprises the notification mode control command, and the operation comprises issuance of a message notification according to the notification mode control command, disregarding a message notification mode pre-configured on the mobile phone.

5. The method as claimed in claim 4, wherein the extracted control part comprises the forwarding control command or the reply-to recipient control command, and the operation comprises automatic setting of a target address for forwarding the message or reply to the message according to the forwarding control command or the reply-to recipient control command, respectively.

6. A mobile phone having a receiving device for receiving a message sent by another mobile phone through a message transmission system, comprising:
   a message decomposition unit for decomposing a received message into a presentation part and an associated control part, the control part comprising at least one command associated with control of processing of the received message; and
   an execution device for automatically executing an operation associated with the message whereby settings for the mobile phone are overridden based on the control part.

7. The mobile phone as claimed in claim 6, wherein the control part comprises one or more of the following:
   a notification mode control command, a forwarding control command, an archiving control command, a reply-to recipient control command.

8. The mobile phone as claimed in claim 7, wherein each command has at least one associated control parameter.

9. The mobile phone as claimed in claim 7, wherein the control part comprises the notification mode control command, and a message notification device issues a message notification according to the notification mode control command, disregarding a message notification mode pre-configured on the mobile phone.

10. The mobile phone as claimed in claim 9, wherein the control part comprises the forwarding control command or the reply-to recipient control command, and the operation comprises automatic setting of a target address for forwarding the message or reply to the message according to the forwarding control command or the reply-to recipient control command, respectively.

11. A method for controlling a mobile phone, wherein the mobile phone has a user interface generator for generating a user interface for the user of the mobile phone to enter a message and a sending device for sending the message to another mobile phone through a message transmission system, the method comprising the steps of:
   generating a user interface for entry of a presentation part and a control part;
   formatting the presentation part into a form identified to be displayed to a recipient;
   formatting the control part into a form identified to be control data comprising at least one command for automatic execution at a receiving mobile phone by overriding settings at the receiving mobile phone; and
   packaging the formatted presentation part and control part into a complete message for sending by the sending device.

12. A mobile phone having a sending device for sending a message to another mobile phone through a message transmission system, comprising:
   a user interface generator for generating a user interface for entry of a presentation part and a control part;
   a message presentation generator for formatting the presentation part into a form identified to be displayed to a recipient;
   a control command generator for formatting the control part into a form identified to be control data comprising at least one command for automatic execution at a receiving mobile phone by overriding settings at the receiving mobile phone; and
   a packaging module for packaging the formatted presentation part and control part into a complete message for sending by the sending device.

13. A non-transitory computer readable medium embodied with a computer program capable of executing all the steps of claim 1 when said program is run on a computer.

14. A non-transitory computer readable medium embodied with a computer program capable of executing all the steps of claim 11 when said program is run on a computer.

* * * * *